Aug. 7, 1956

E. B. NOLT 2,757,602

AUTOMATIC PICK-UP BALER

Filed Oct. 30, 1951

INVENTOR
EDWIN B. NOLT
BY
Richard E. Babcock Jr.
ATTORNEY

Aug. 7, 1956 E. B. NOLT 2,757,602
AUTOMATIC PICK-UP BALER
Filed Oct. 30, 1951 5 Sheets-Sheet 2
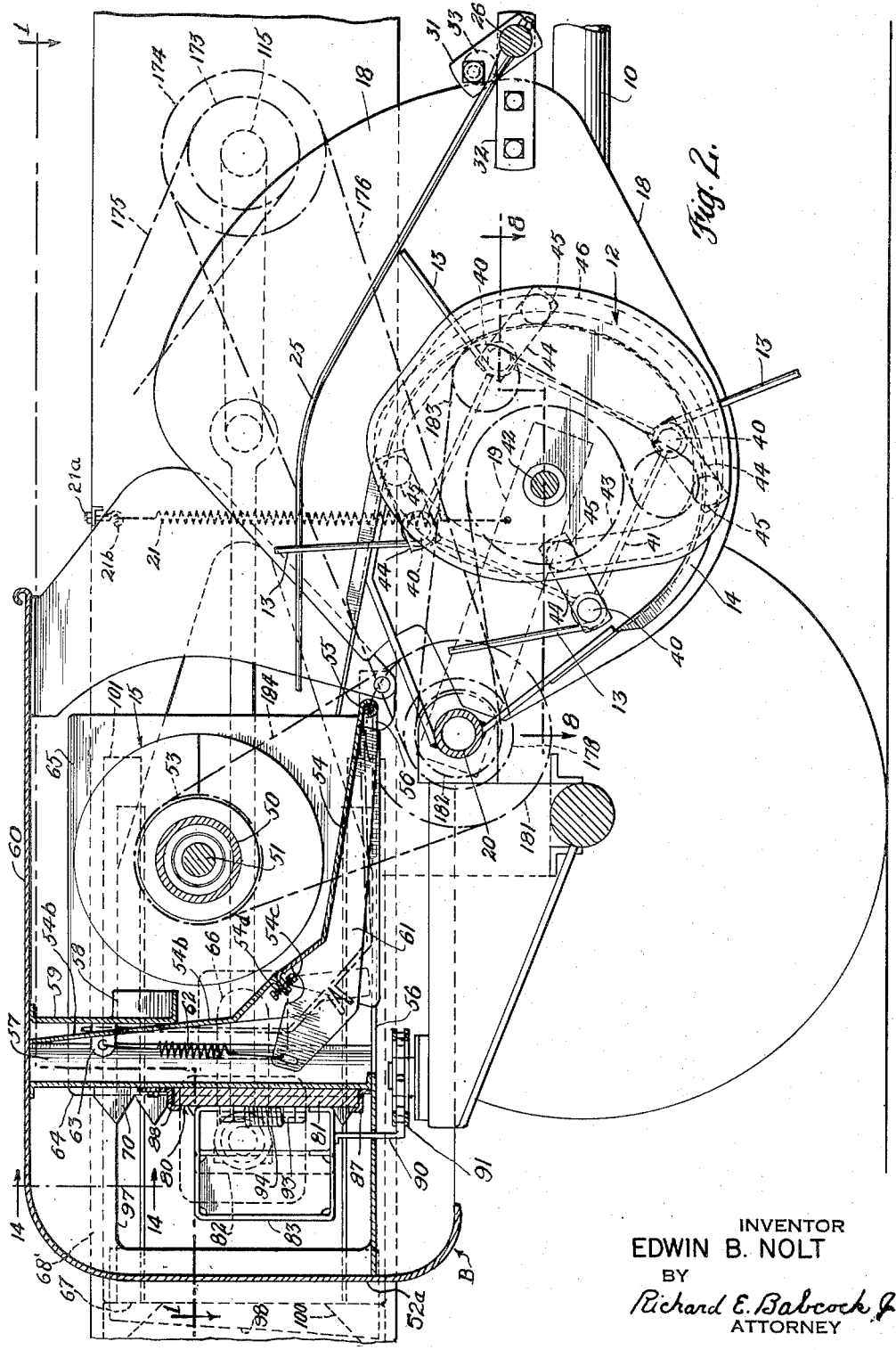
INVENTOR
EDWIN B. NOLT
BY
*Richard E. Babcock Jr.*
ATTORNEY Aug. 7, 1956  E. B. NOLT  2,757,602
AUTOMATIC PICK-UP BALER
Filed Oct. 30, 1951  5 Sheets-Sheet 3
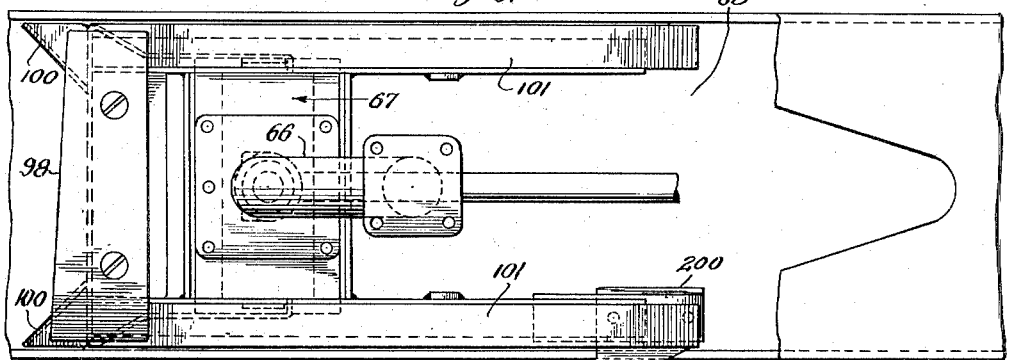
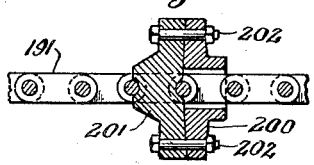
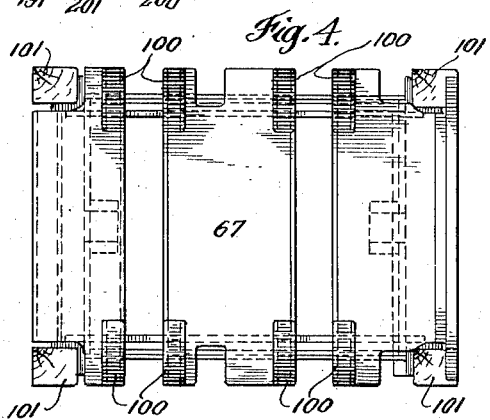
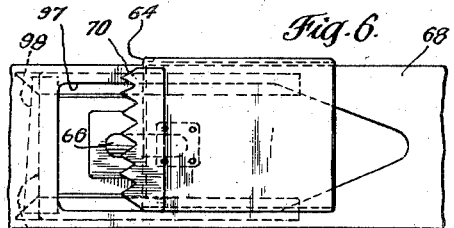
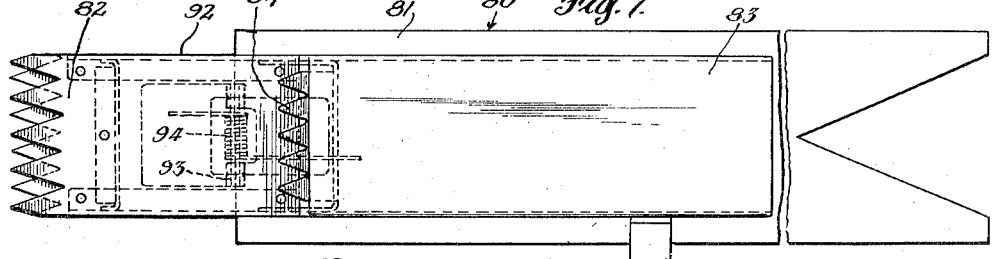
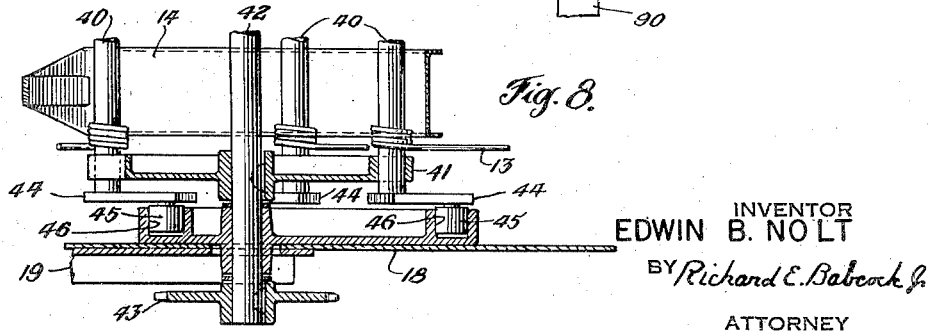
INVENTOR
EDWIN B. NOLT
BY Richard E. Babcock Jr.
ATTORNEY

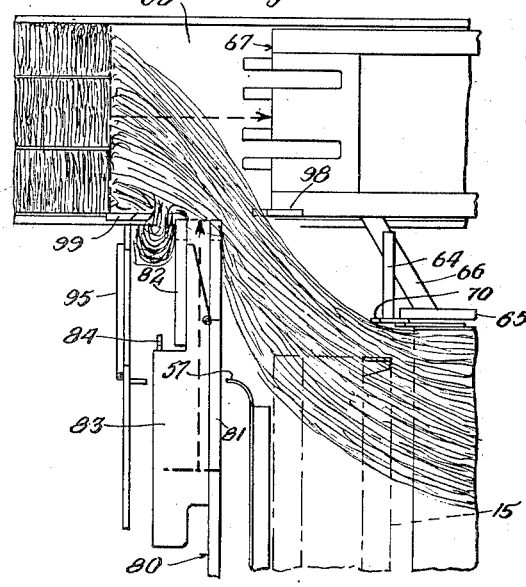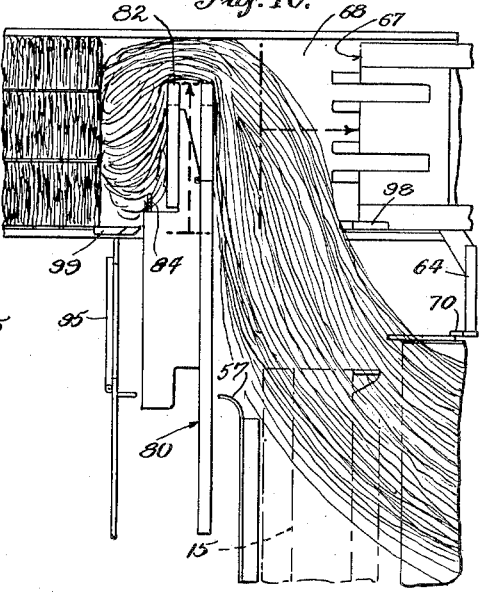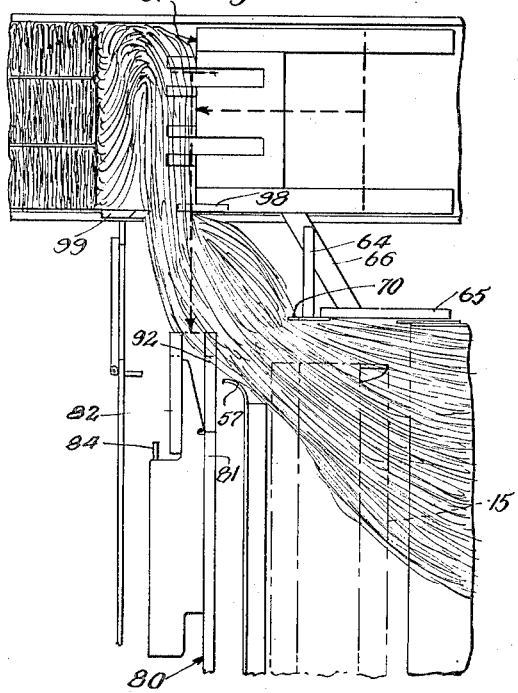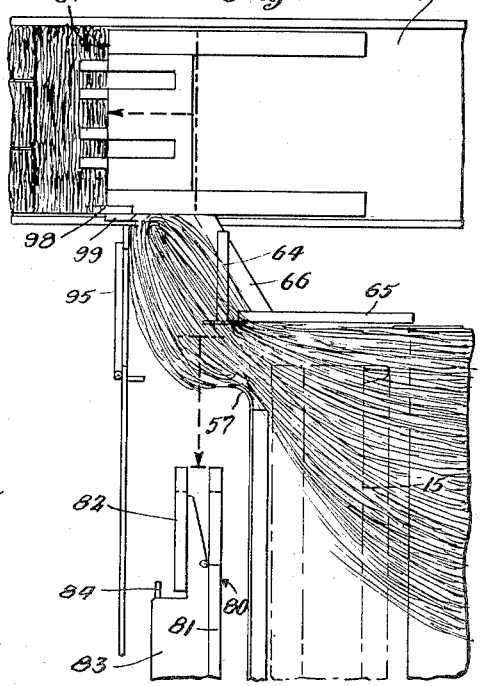

INVENTOR
EDWIN B. NOLT

BY Richard E. Babcock Jr.

ATTORNEY

United States Patent Office 2,757,602
Patented Aug. 7, 1956

2,757,602

AUTOMATIC PICK-UP BALER

Edwin B. Nolt, New Holland, Pa., assignor, by mesne assignments, to Sperry Rand Corporation, a corporation of Delaware Application October 30, 1951, Serial No. 253,783

23 Claims. (Cl. 100—142)

This invention relates to an automatic pick-up baler of the class in which gathered crop material is fed horizontally through a feed opening in the side of the baler casing into the path of a bale plunger reciprocating in said casing. More particularly, the invention relates to an improved infeed mechanism for receiving the crop material from a pick-up device and delivering it into the baler chamber.

It is a primary object of the invention to provide an infeed mechanism by which the crop material is fed into the bale chamber and distributed thereacross in a more rapid, effective, uniform and efficient manner than has heretofore been possible. This object is attained by a novel arrangement whereby a cross-feed conveyer presents material in consolidated form to a condenser or pusher which reciprocates with the bale plunger and, on each forward stroke of the plunger, progresses the consolidated material into a position to be engaged by a wadboard reciprocating transversely and in opposite phase to the plunger and condenser, the wadboard in turn progressing it into the bale chamber. Important features of this arrangement consist in: having the condenser carried by the bale plunger for reciprocation therewith, the connecting means between the condenser and plunger extending through and being movable in the feed opening of the bale chamber; and a construction and relative arrangement of the several feeding elements so as to bring about a continuity of feed from the pick-up to the bale chamber by the most direct path.

A more specific object is to deliver the hay or other crop material into the side of the chamber in such manner that it occupies and is of substantially uniform density throughout the depth of the bale chamber. In accordance with the invention, this object is attained by exerting lateral pressure against the infeeding windrow to expand it vertically into the form of a ribbon extending between and having its opposite edges confined by the top and bottom respectively of the feed box. This ribbon is maintained on edge, and delivered to the wadboard which supports it against substantial downward displacement while feeding it into the bale chamber along a downwardly inclined surface which acts against the top of the ribbon to consolidate the top portion thereof and to bring it to a density substantially equal to that of the bottom portion of the ribbon.

It is a further object to increase the efficiency of the wadboard by permitting it to enter the bale chamber as far as is necessary to properly distribute the material thereacross, and to operate within the bale chamber for as long a period as possible between compression strokes of the plunger, while at the same time avoiding damage due to compression of material against the wadboard. This is attained in part by offsetting the condenser rearwardly with relation to the plunger, whereby the condenser lags behind the plunger on the compression stroke to provide ample clearance for the wadboard as same is retracted from the bale chamber. It is also attained in part by providing the wadboard with a free end portion which is yieldable forwardly under the pressure of hay urged thereagainst by the plunger. This of course reduces the required margin of clearance between the wadboard and the plunger. Also, contributing to the attainment of this object is the arrangement utilized in the preferred embodiment of the invention whereby the wadboard moves at a substantially greater speed than the plunger and through a greater range.

A further more specific object consists in the provision of an improved drive coupling between the wadboard and the bale plunger, employing a connection which is releasable in one direction to prevent forcing of the wadboard into the bale chamber against an unduly compacted mass of hay or the like such as might damage it, the connection being automatically reestablished to withdraw the wadboard from the baling chamber on the next succeeding compression stroke of the plunger.

A still further specific object consists in the provision of yieldable means to permit escape of hay from in front of the condenser, and thereby avoid damage in the event of undue accumulation before the condenser.

In the accompanying drawing:

Figure 1 represents a horizontal sectional view, partly broken away of a pick-up baler exemplifying the invention, the view being taken on the line 1—1 of Figure 2, looking in the direction of the arrows;

Figure 2, a section on the line 2—2 of Figure 1, looking in the direction of the arrows;

Figure 3, a fragmentary side elevation of the baler, a portion of the bale chamber side wall, the condenser, and other infeed elements, being removed to permit a clearer view of the plunger;

Figure 4, an end elevation of the plunger as viewed from the left in Figure 3;

Figure 5, a detail section on the line 5—5 of Figure 3, illustrating the connection between the plunger and the wadboard actuating mechanism;

Figure 6, a fragmentary side elevation on a reduced scale, showing the positions assumed by the bale plunger and the pusher relative to the feed opening in the bale casing in the advanced position of the bale plunger;

Figure 7, an enlarged fragmentary elevation of the wadboard, as seen from the rear; and Figure 8, a detail section on the line 8—8 of Figure 2, looking in the direction indicated by the arrows;

Figures 9 to 12, inclusive, represent fragmentary sections on the same plane as Figure 1 respectively diagrammatically illustrating successive positions assumed by the several elements of the invention during each operative cycle of the baler plunger;

Referring now in detail to the accompanying drawings, the baler which is shown therein by way of exemplification of the invention is provided with a tongue 10 for hitching it to the drawbar of a tractor. The baler is preferably provided with a motor 11, but in some instances, power can be delivered to it through a conventional power take-off drive from the tractor.

The baler is adapted to be towed through a field of cut and windrowed hay or other crop material, and it comprises a pick-up means operative to automatically lift the hay from the stubble and deliver it to an infeed mechanism. The infeed mechanism in turn feeds the gathered crop material transversely into the baler casing through a feed opening in one side of the casing. In accordance with usual practice, the baler is operative to compress the hay into bales, tie the formed bales, and eject same onto the ground or onto an accompanying vehicle.

The pick-up

Figure 1:
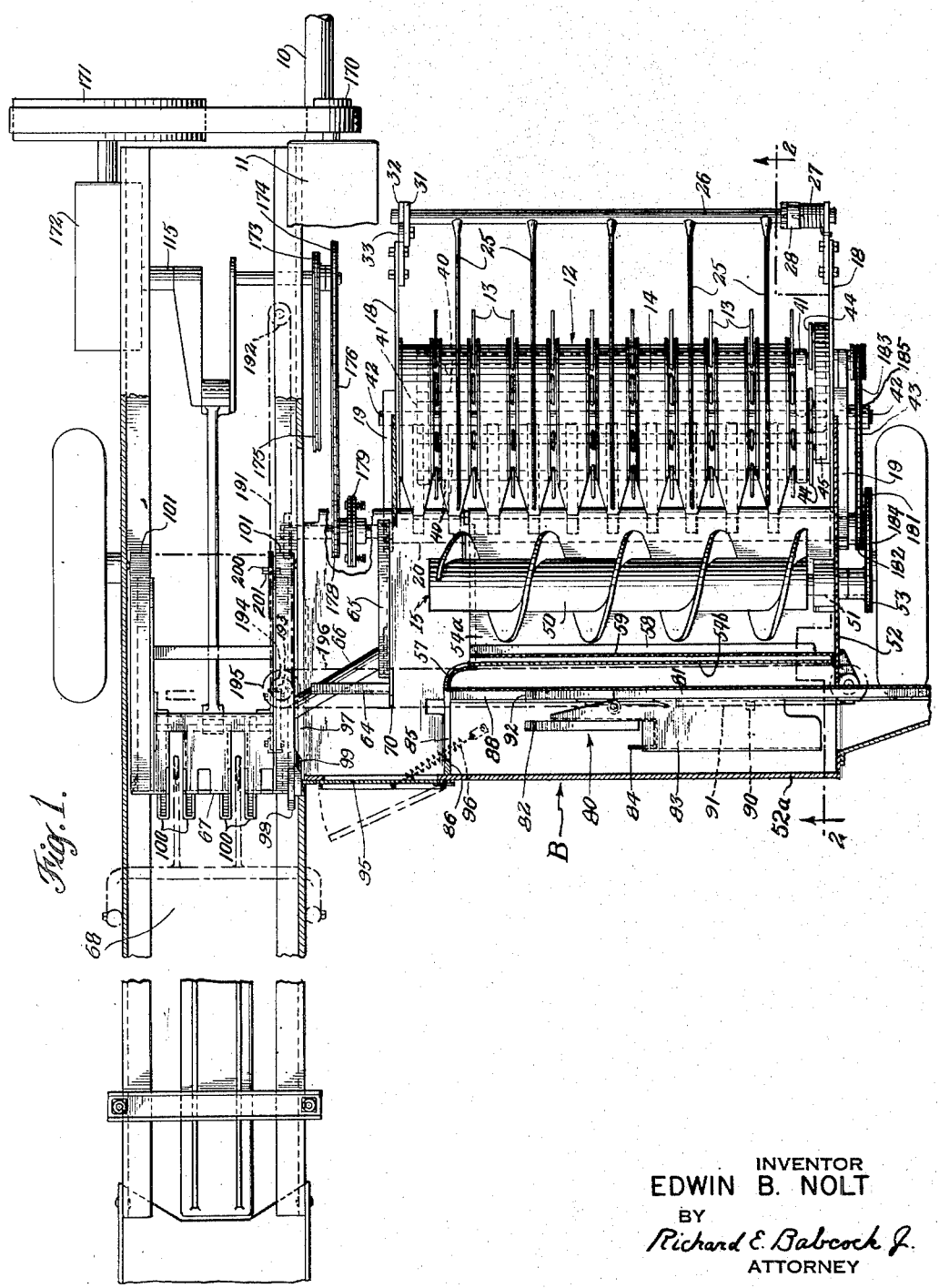

The pick-up 12 is mounted on the right-hand side of the machine as it moves through the field and has a reel on its front end that includes a series of spring teeth 13 which rake across the ground and move up around the nose portion of the floor 14 of the pick-up to carry the hay up onto the generally horizontal portion of the floor. The hay is pushed across this horizontal floor as additional hay is continually picked up and, after feeding across the floor, it is pulled in under the bottom side of the free end auger 15 of the infeed mechanism, which is operative to deliver the hay laterally across the feed box or housing. Feed box B which opens forwardly, includes a generally horizontal bottom 56, a cover 60, and side and rear walls 52 and 52a respectively. The pick-up unit 12 has a pair of side walls 18 which also form a portion of the frame of the pick-up, and these walls are pivotally mounted on arms 19, that turn about the axis of shaft 20 (see Figures 1 and 2) forming the main drive shaft for delivering power to the pick-up device and the feed auger. When the baler is in use, the pick-up is suspended by a spring 21 (see Figure 2), that is disposed on the inner or baler side of the pick-up (as shown in Figure 1). The tension of spring 21 may be adjusted by means of a nut 21a on the threaded shank of hook 21b so that the pick-up normally floats at a level such that the raking teeth 13 just clear the ground. As the machine moves through the field, the hay is picked up by the raking fingers 13 of the pick-up reel and is delivered up onto the floor 14 of the infeed mechanism. The floor 14 is formed of a plurality of spaced channel shaped sections that are mounted on the pick-up as shown in Figure 2. The fingers 13 move through the slots formed between the channel sections to carry the hay up to the auger and the fingers are then retracted downwardly, the hay passing onto the auger without clogging. Also, the channel sections all face upwardly along the horizontal floor section of the pick-up so that any leaves that are shaken free from the stalks are collected in the channels between the side walls thereof and are fed on with the infeeding hay into the infeed mechanism, thus are not lost.

Preferably resilient wind guards or hold down means are employed to press the hay down as it feeds up on the floor portion 14. The hold down means illustrated in the accompanying drawings comprises a series of resiliently downwardly biased wind guard bars 25 which are supported from the pivotally mounted bar 26 carried at the front of the pick-up. The bar 26 is resiliently urged by spring 27 to move in a direction to cause the wind guard bars to bear down on the hay, and the tension of spring 27 may be adjusted by rotary movement of the collar 28 that is pinned to bar 26 and to which collar one end of the spring is fixed in a manner to wind the coil up or loosen it, the other end of the spring being fixed to the frame of the pick-up. The wind guard bars 25 (as shown) are carried at their one end in the bar 26 and extend rearwardly up over the floor of the pick-up mechanism so that their free ends all point toward and terminate near the auger 15. The hay upon being pushed back is received and acted upon by a suitable cross conveyor such as the auger 15 in the instant embodiment, such cross conveyor constituting a part of the infeed mechanism hereafter described.

As best illustrated in Figure 2, the bar 26 has an adjusting means at its far or inner end, such means comprising a lever 31 fixed to the inner end of the bar 26 to rotate about its bearings in the stub arm 32. The relationship between the lever 21 and stub arm 32, is controlled by means of the adjustable cam 33 which may be used to raise or lower the free end of lever 31 with respect to the stub arm. The spring 27 at the opposite end of the rod 26 is normally biased to hold the cam 33 pressed firmly against the stub arm so that the windguard bars are resiliently urged to their lowermost position, in which they are spaced somewhat from the floor 14 of the pick-up. The cam 33 however, may be adjusted to vary this spacing as desired.

As hay is fed in under the wind guard bars 25, they may be lifted to allow large volumes of hay to pass under them while they maintain a proper compacting pressure on the hay to prevent any loss of hay due to the wind blowing it out of the pick-up, and the degree of pressure as well as the spacing of the wind guard bars from the floor 14 may be adjusted to suit all conditions normally encountered.

When setting the cam 33 initially the cam is adjusted to hold the free ends of the wind guard bars 25 spaced somewhat above the surface of the pick-up floor on table 14 so that they do not hinder the initial feeding of the hay as it begins to move up over the table 14 and under the fingers. The structure of the pick-up reel is best seen in Figures 1, 2, and 8 and the reel includes several series of the spring fingers 13, each series being carried on one of the several cross shafts 40 which are mounted in suitable spider means 41 keyed to the center shaft 42 that is driven by sprocket 43 (Figure 1) as will appear more fully below. The shafts 40 each have a lever or crank arm 44 keyed thereto, the outer end of the arm having a cam follower 45 fixed thereto, which moves in the cam track 46. It will be apparent from an inspection of the drawings that the cam arrangement is such as to rotate the shafts 40 so that the spring fingers 13 are held projected as they pass under and around the nose of the pick-up and, as the reel rotates to lift the hay up on to the floor 14 of the pick-up, the cam drives the fingers forwardly with a motion to lift the hay quickly onto the floor of the pickup. After the fingers pass around the nose of the pick-up and push the hay up onto the floor of the pick-up, the spring teeth 13 are rotated backwardly relative to the rotational movement of the reel so that they are retracted vertically from the hay as it is pushed forwardly while the reel continues its rotation. The spring fingers then are projected again as they sweep around under the bottom of the nose of the pick-up to lift the hay from the ground. Obviously the spring fingers will be similarly projected and retracted during repeated rotations of the reel.

Hay feed to compression chamber

A plan view of the hay feeding system or infeed mechanism is seen in Figure 1, this view showing the disposition of the infeed mechanism both with respect to the pick-up and the baler. The main portion of the feed box or housing B is disposed rearwardly of the pick-up and contains a forwardly disposed cross-feed conveyor, as exemplified by the auger 15, to receive the gathered crop material from the pick-up unit 12 and convey same toward the baler. The flights of the auger are fixed to the auger tube 50 secured coaxially on a shaft 51 which in turn is supported in a single bearing carried in the wall 52, at the end of the feed housing remote from the baler. The shaft 51 is driven by a sprocket 53 so that it rotates in a direction to pass the hay under and along the rear side of the auger, and with this construction, it is apparent that the hay may pass easily from the auger off of the free end thereof toward the baler in a path transversely to the longitudinal axis of the baler.

Disposed beneath and extending rearwardly upwardly behind the auger 15 is a guide plate 54 which is preferably resiliently floatably mounted to be capable of moving away from the auger under the influence of large masses of crop material passing between the auger and the plate 54. This is for the purpose of enabling the auger to handle large concentrations or masses of crop material without being jammed.

To this end the forward edge of the plate 54 is hinged, as at 55, to the fixed horizontal bottom 56 of the infeed housing for swinging movement about a horizontal axis. A rigid arm 61 carried by the plate 54 and projecting rearwardly from therebeneath is connected by means of a tension spring 62 to a bracket 63 fixed to the supporting hanger or web 59. Thus, the spring will tend to resiliently urge the plate 54 upwardly toward the auger. In order to limit the upper swinging movement of the plate 54 a section or extension 54b carried by the plate 54 abuts against the cover plate 60 of the feed chamber. It will be noted that the extension 54b extends rearwardly up behind the web 59 and cooperates therewith to form a composite wall structure or baffle separating the auger from the rear portion of the infeed housing in which the wadboard reciprocates. Thus, in effect this composite wall structure constitutes a vertical partition dividing the feed box into relatively parallel compartments for the feed auger and the wadboard respectively.

The upper section or extension 54b slideably engages a vertical corner post 57 for movement along same responsive to the movement of the plate 54 about its hinge connection 55. This serves to maintain the extension or section 54b in close proximity to the lower edge of the web 59 thereby preventing the passage of the hay between the web 59 and the extension. Such an arrangement of course requires a flexible connection between the plate 54 and the extension 54b thereof. In the instant embodiment such a connection 54c is defined by a bolt passing through opposed flanges of the respective plate sections 54 and 54b and having compression springs 54d thereon resiliently urging the flanges into flush abutting relationship, and thus tending to resiliently maintain the two plate sections 54 and 54b in their normal or innermost positions, as shown in Figure 2.

A stripper bar 58 carried by web 59 depending from the horizontal cover 60 of the infeed housing cooperates with the auger 15 to engage the hay or other gathered crop material and prevent it from wrapping around the auger, thereby causing the hay to be fed continuously transversely toward the baler.

Under normal conditions the pick-up unit will supply hay to the auger more or less uniformly and for a substantial distance lengthwise of the auger, but the hay or other material which is picked up by the auger at its end remote from the baler is of course moved toward the baler and there is thus a constantly increasing quantity of hay or other material to be moved toward the baler. In other words the greatest quantity of hay will naturally be adjacent the free end of the auger because all of the hay picked up anywhere along the length of the auger will be moved toward the free end. To prevent congestion and jamming and to permit the ready handling of this gradually increasing quantity of material, the stripper bar 58 preferably is made to slant upwardly in a direction approaching the baler, thus, providing a gradually increasing peripheral space within which the hay may accumulate around the auger as the hay moves along the auger toward the baler.

The free end of the auger 15 and the corresponding end 57 (as defined by the end part) of the dividing wall or partition are both spaced a substantial distance from the adjacent sides of the bale casing to provide a longitudinal condenser chamber occupying the inner end of the feed box and extending parallel to the bale chamber on one side thereof. It will be noted that the composite wall or partition 54B—59 extends in a direction transecting the condenser chamber in a lengthwise direction, so that the ends of the auger and wadboard compartments both communicate with the condenser chamber.

Figure 14:
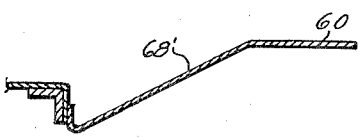
Figure 14 represents a detail section on the line 14—14 of Figure 2.

Disposed in this chamber for reciprocation parallel to and in phase with the reciprocation of the bale plunger is a condenser or pusher 64 which is carried by and is a lateral extension from the bale plunger. A wall 65 fixed to the condenser 64 reciprocates in front of the free end of the auger and is spaced from the auger end a substantial distance which however is relatively small compared to the height of the condenser chamber between its bottom 56 and its top 68'; which it will be noted is inclined upwardly from the side of the bale casing, as best shown in Figure 14, to its juncture with the main portion 60 of the feed box cover.

The wall 65 cooperates with the rounded partition end post 57, which is relatively spaced from its path of movement, to define a throat of closed cross-section alongside the condenser path.

Thus, when the side wall 65 is moving in front of the auger, the rotating auger consolidates the windrowed hay in the space between its end and the side 65 of the condenser and laterally compresses the hay into the form of a ribbon disposed on edge and extending vertically for substantially the full distance between the top and bottom of the condenser chamber.

The throat defined between the partition end post 57 and the side wall 65, in the advanced position of the condenser, permits the hay to extend and feed continuously from the auger 15 into alignment with the wadboard (on the opposite side of partition 54b—59 from the auger) and thence to the feed opening 97, even during the advance stroke of the condenser. When the condenser moves back, the laterally compressed hay will of course expand into the space in front of the condenser to be engaged by the condenser on its next advance stroke and progressed forwardly by it into position for engagement by the wadboard.

The condenser or pusher 64 is carried by the bale plunger for movement therewith and, as above mentioned, functions as a lateral extension of the plunger. In the preferred embodiment the pusher 64 is mounted on a bracket 66 (see Fig. 3) rigidly secured to the plunger 67, and thus as the plunger reciprocates in the compression chamber 68, the pusher 64 moves with it. The pusher has a generally flat face but has a toothed member 70 fixed to one vertical edge adjacent to the auger 15 as shown in Figure 1, the member 70 having a forwardly exposed toothed edge that is adapted to pass in front of the end of the auger to positively engage in the hay to draw the hay rearwardly from the free end of the auger.

Preferably the toothed member 70 is disposed to grip the hay and drag it rearwardly over the rounded face of corner post 57 without substantially drawing apart or separating the hay.

The primary function of the pusher 64 is to condense and transfer the infeeding hay longitudinally from the first cross conveyor or auger 15 to dispose it in proper condition and location for engagement by a second cross conveyor in the form of a wadboard 70 which moves the hay transversely through the feed opening in timed relation to the movement of the plunger, and uniformly distributes and precompresses the hay across the baler compression chamber 68 in the path of the plunger when the latter is retracted, the wadboard then being withdrawn out of the path of the plunger on the compression stroke of the latter.

It will be noted that the wadboard, pusher and auger are all disposed and operate in a common horizontal plane with the main baler plunger, thus requiring no elevation of the hay to different levels by the infeed mechanism, and in addition all of the several elements of the infeed mechanism may be covered and guarded by the horizontal cover plate 60 of the infeed housing.

The cover plate 60 cooperates with the partition 54B—59 and other parts of the feed box to enclose the auger and wadboard in compartments of closed cross-section, save for feed openings. Also, its sloping portion 60 serves together with the feed box bottom, the condenser wall 65, and the relatively spaced auger end and relatively spaced end post 57, in defining a passage of closed cross-section, save for feed openings, within the condenser box. The cover plate also guards against bodily injuries to persons who might otherwise fall or thrust limbs into the infeed mechanism.

The wadboard 80 in the instant embodiment is provided with a pair of hard wood pieces 81 and 82 both of which have saw tooth shaped ends, and includes a metal frame piece 83 that provides an expanded surface at the end of the wadboard. The metal frame 83 has an additional stepped back toothed edge 84 fixed thereon that assists in the even distribution of the hay across the bale chamber and which also functions to drag into the bale chamber any hay that may be entrapped between the wadboard and the safety door 95 hereinafter described.

The cross sectional shape of the wadboard is best illustrated in Figure 1, in which it is seen that the wadboard reciprocates back and forth through an aperture 84 in the wall 85. The wood piece 82 is carried in the metal frame piece 83 which is fixedly supported from the other wood piece 81. The entire wadboard assembly is mounted in slide ways 88 and 87 which engage around the edges of the vertically disposed board 81. This construction is provided to guide the wadboard 80 as it reciprocates into and out of the compression chamber 68 in opposite phase to the movement of the compression plunger 67.

As shown in Figure 2, the wadboard has a downwardly extending arm 90 fixed thereto and this arm is pinned to a sprocket chain 91 that is carried around suitable wheels for oscillation in a horizontal plane. The chain 91 is driven from the motion of plunger 67, in the preferred embodiment, as will appear below, and when the compression plunger moves in the compression chamber, the chain 91 is driven so that the wadboard 80 is moved in timed relation to the motion of the compression plunger.

Figure 13:
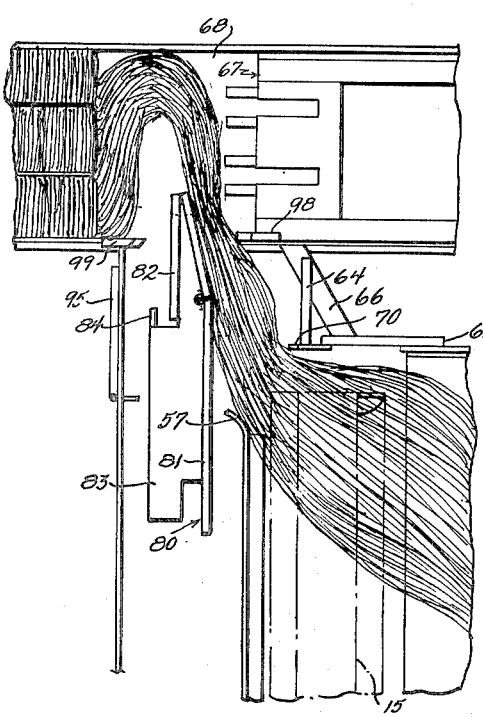
Figure 13 represents a view similar to Figures 9 to 12, inclusive, showing the manner in which the hinged free end of the wadboard yields forwardly under the pressure of hay, just before the wadboard is withdrawn from the bale chamber.

In order to avoid damage to the wadboard such as might result from the compression of hay thereagainst by the plunger before the wadboard is completely retracted from the compression chamber, it is desirable to provide the wadboard with a resiliently yieldable free end section 92, as best illustrated in Figures 1 and 7. This yieldable section 92 is hingedly connected to the main section of the board 81, as at 93, a coil spring 94 being disposed around the hinge pintle with its opposite ends abutting against the board 81 and hinge section 93 respectively to normally maintain these sections in alignment. It will be seen that the spring 94 will yield as shown in Figure 13 to permit the hinge section 92 to swing rearwardly in the event a compression force of predetermined magnitude is exerted due to the compression of hay against the section 92 by the plunger.

As best illustrated in Figure 1 a safety door 95 is shown disposed at the end of longitudinal feed passage and adjacent the junction of the motions of the pusher and the wadboard. The door is pivotally mounted on the frame of the feed chamber to open outwardly and is urged to a close position by an over center spring 96. The safety door is provided so that if for any reason hay cannot be fed into the compression chamber while the pusher 64 continues to deliver wads of hay forwardly, the hay may force the door 95 open and pass out to fall on the ground. It is essential that a build up of hay be prevented in order to avoid any damage from a jamming of hay in front of pusher 64.

In normal operation, however, reciprocating in opposite phase to the plunger, the wadboard 80 feeds the hay from the longitudinal feed passage into the compression chamber through the feed opening 97 in the side wall of the compression chamber when the plunger 67 is retracting, and as the plunger moves forwardly the wadboard is retracted. Upon the continued forward motion of the plunger 67, the newly fed hay is compacted and anvil means 98 on the plunger cooperates with a stationary knife 99 on the bale case to sever the stalks of hay that project through the feed opening 97 of the compression chamber.

The baler proper which is only shown fragmentarily may be of generally conventional construction in which the reciprocating plunger 67 is arranged to compress the hay into bales, the completed bales being tied by conventional tieing means (not illustrated) and the action of the plunger being utilized to eject the formed and tied bales.

It will be noted that the face of the plunger 67 is vertically slotted in usual manner to cooperate with the vertically swinging twine feeding needles of the twine tier mechanism, and disposed adjacent edges of the slots are punches or projections 100 carried in advance of the plunger face as clearly shown in Figure 3. With the provision of such projections 100, the feed motion of the twine needles may be advanced somewhat so that the needles can start to move on their path through the compression chamber before the face of the plunger pushes the hay all the way back in the chamber. The needles may be timed to move in as soon as the triangular projections of punches have cleared the path. In this manner a longer time period may be provided in which to complete the ties without slowing down the plunger motion while completing the tieing cycle.

Referring still to the plunger, it is designed to fit loosely within the generally rectangular bale compression chamber 68, and is provided with wooden bearing strips 101 at its edges, these bearing strips slideably guiding the plunger in its reciprocation through the metal compression chamber 68.

Drive system

The power drive system for the machine is shown in Figures 1 and 2, being illustrated schematically in Figure 2. Referring to the plan view of Figure 1, the engine 11 delivers power to the drive sheave 170 through which power is transmitted by belt to the flywheel 171. The flywheel is connected directly to the drive shaft gear box 172 where suitable gear reduction is made and the output of the gear box is connected to one end of the crank shaft 115. As the crank shaft rotates it pushes the compression plunger 67 back and forth in the bale compression chamber to accomplish the desired compression of the several slices of the hay into a bale. The opposite end of the crank shaft has a pair of sprocket wheels 173 and 174 keyed thereon. The sprocket wheel 173 meshes with and drives a drive chain 175, shown fragmentarily, which is adapted to actuate the tier mechanism in timed relation to the reciprocation of the plunger, in accordance with more or less conventional practice.

The sprocket wheel 174 drives a chain 176 which in turn rotates a sprocket wheel 178 fixed to one of the plates of a clutch 179 on the drive shaft 20, the clutch 179 being a conventional slip clutch so that if any jams are encountered in the pick-up conveyor system the plunger in the bale chamber can be continuously driven to compress hay in order to prevent clogging of the entire machine. The output side of clutch 179 is connected to one end of drive shaft 20 which shaft delivers power from its opposite end to sprocket wheels 181 and 182 and through chains 183 and 184 to the sprockets 185 and 53 respectively fixed to the pick-up shaft 42 and the feed auger shaft 51. The motion of the compressor plunger 67 is utilized to drive the wadboard 80 as suggested above. For this purpose, and as best illustrated in Figures 3 and 5, the plunger is fixedly connected with a horizontally disposed sprocket chain 191 that is thus oscillated as the plunger moves back and forth in the compression chamber. The chain 191 is carried on sprockets 192 and 193 that are mounted to rotate in a plane below the under side of the bale chamber and sprocket 193 is keyed to drive shaft 194 that drives sprocket 195. The sprocket 195 engages chain 196 which is thus oscillated in timed relation with the motion of the plunger, and one side of chain 196 is fixed by a link 90 to the wadboard 80 to cause it to move in and out of the compression chamber in timed relation to the motion of the plunger 67. In this manner, hay is stuffed into the chamber as the plunger retracts and the wadboard is withdrawn when the plunger motion is reversed.

In accordance with the invention, the connection between the plunger 67 and sprocket chain 191 comprises a bracket 200 fixed to the plunger and slideably receiving the chain 191. A stop 201 secured on the chain abuts against the bracket 200 in a direction to be engaged thereby on the compression stroke of the plunger. Normally the bracket and stop are secured together by frangible elements such as the bolts 202, which are adapted to part under excessive tension and to allow the bracket 200 to be retracted with the plunger away from the stub 201 without moving the chain 191.

Thus, if the wadboard should ever become jammed so that the frangible bolts 202 are broken, the construction is such that even though the infeed stroke of the wadboard is interrupted before completion, the abutment between the stop 201 and the bracket 200 will function to retract the wadboard as the plunger moves forwardly. With such means the wadboard is positively withdrawn, even though a jam is encountered, without any more serious damage than the breaking of the bolts 202.

*Operation*

As the baler is drawn lengthwise of a windrow, the pickup mechanism progressively raises the windrow lengthwise to a generally horizontal level above the ground and delivers it to the auger 15 of the infeed mechanism. It is then delivered into the bale chamber by the successive actions of the auger 15, condenser 64 and wadboard 80.

The operation of the infeed mechanism is illustrated diagrammatically in successive steps in Figures 9 to 12 respectively, in each of which the direction and extent of movement of the plunger and wadboard from the preceeding position is indicated by the broken line arrows.

In Figure 9, the several infeed elements are shown in the positions which they assume just as the bale plunger 67 is retracted out of the path of reciprocation of the wadboard 80. At this time it will be seen that the wadboard has already moved a substantial distance on its advance stroke, having at this time crossed the condenser chamber in front of the condenser 64 and commenced its entry into the bale chamber. In so moving, the wadboard will have thrust against that portion of the windrow pressed longitudinally into its path on the preceeding advance stroke of the condenser, and will have pressed much of the windrow head into the bale chamber, while other portions of said windrow head will have commenced to fold around the end of the wadboard, as shown.

As the bale plunger continues its retraction from the position of Figure 9 to its fully retracted position, as in Figure 10, the wadboard advances into the bale chamber to its full extent, thus, compressing the portion of the windrow head in alignment therewith against the far side of the bale chamber, and also dragging in a further portion of the windrow head which is folded around the wadboard end on both sides of the wadboard.

The windrow will then extend from the wadboard, in what is believed to be a continuous rope, across the condenser chamber to the feed auger. At the same time it will be noted by reference to Figure 10 that the condenser is retracted beyond the auger, and the latter, being directly in line with a portion of the feed opening into the bale chamber, can momentarily urge some of the hay of the windrow directly across the condenser chamber into the bale chamber, thereby supplementing the action of the wadboard.

As the bale plunger 67 then begins its compression stroke, carrying with it the condenser 64, the wadboard is retracted from the bale chamber and out of the path of the advancing plunger and condenser. Thus, by the time the plunger has advanced to the position indicated in Figure 11, the wadboard will have been retracted out of the bale chamber and clear of the path of the condenser which in turn engages the windrow and progresses same so that the next succeeding windrow head is disposed for engagement by the wadboard on its next advance stroke.

As the wadboard is retracted from the bale chamber, from the position of the Figure 10 to that of Figure 11, the advancing bale plunger compresses hay against it. As shown in Figure 13, this pressure is relieved by yielding movement of the wadboard end 92 to avoid possible breakage of the wadboard.

As the plunger 67 moves to the end of its compression stroke, as shown in Figure 12, the wadboard is fully retracted out of the path of the advancing windrow. At this time the consolidated main body of the windrow is sheared off at the feed opening by the combined action of the knife 99 and the anvil 98 carried by the plunger. It will then be precompressed in front of the fully advanced condenser 64 and will extend from the feed opening across the face of the condenser, thence, between the corner post 57 and the condenser side wall 65 to the feed auger 15 and the space between the side wall 65 and auger 15.

After the condenser has moved between the auger 15 and the feed opening, as in Figures 11 and 12, it will be apparent the auger is no longer able to urge any portion of the windrow directly into the bale chamber. However, the continuously rotating auger continues to feed the windrow, which at this point is consolidated in the space between the auger end and the condenser side wall 65. Such compression of the windrow against the side wall 65 will cause the hay to expand across the condenser chamber into the path of the condenser, immediately following subsequent retraction of the condenser beyond the auger.

From the position shown in Figure 12, the plunger then is retracted through the position shown in Figure 9. During such movement the wadboard moves the next windrow head into the bale chamber in the manner above described, and the entire cycle of operation is repeated.

In connection with the operation of the infeed mechanism it is of importance to note that the condenser 64 is displaced rearwardly from the operative end of the bale plunger 67. Thus, the condenser is retracted clear of the path of movement of the wadboard at the initial stage of the plunger retraction stroke (as in Figure 11, but with the arrows reversed), permitting the wadboard to commence its operative stroke past the condenser even before the bale plunger is retracted completely from the path of the wadboard. Conversely, on the compression stroke of the plunger, the retraction of the wadboard may be so timed as to provide only a minimum clearance with the plunger, while still allowing an ample margin of clearance between the wadboard and the condenser which, due to its rearwardly staggered position, lags behind the plunger on its compression stroke.

Thus, the wadboard is permitted to enter the bale chamber as far as is necessary in order to properly distribute the hay thereacross, and to remain therein for a maximum period between compression strokes of the plunger. A superior distribution and conditioning of hay in the chamber is thus attained.

During the passage of the windrow from the pick-up 13 into the bale chamber, it will be seen that the windrow is passed under the auger 15 in the form of a horizontal sheet. As this sheet is moved endwise of the auger and consolidated in the space between the end of the auger and the vertical condenser wall 65, as in Figure 12, it is transformed into a vertical band or ribbon, the transverse auger pressure serving to consolidate the ribbon and to expand it vertically to occupy the full vertical space between the top and bottom of the feed box. At this stage the ribbon is flanked laterally by the end of the auger 15 and the rounded post 57 on the one hand and by the condenser side wall 65 on the other hand. Thus, at times the end of the auger 15, rounded corner post 57 and condenser side wall 65 cooperate with the top and bottom of the feed box to define a throat of substantially closed cross-section.

This vertical dimension of the windrow is maintained substantially constant as it expands laterally into the path of the condenser as the latter is retracted, and then, on the advance stroke of the condenser, is progressed into position for engagement by the wadboard. Thus, the portion of the windrow which, at any given time, may be disposed for engagement by the wadboard on its next succeeding stroke, occupies the condenser chamber for its full vertical extent.

Since the main portion of the feed box cover 60 is disposed at a substantially higher level than is the top of the bale chamber 68, and is connected to the casing by a portion 68' (Figure 2) which slopes downwardly across the condenser chamber to the upper edge of the feed opening 97, it will be apparent that as the wadboard 89 moves this section of the windrow into the bale chamber, the sloping cover portion 68' will have a cam action tending to press down against and vertically consolidate the upper portion of the windrow so that the latter, after passing through the feed opening 97 (the upper edge of which is slightly lower than the top of the bale chamber) will expand against the top of the bale chamber. The engagement of the hay by the toothed end of the wadboard supports it against bodily downward movement, and thus localizes the consolidating action of the sloping cover portion 68', and the normally relatively dense bottom portion of the hay, in passing through the feed opening 97, expands downwardly somewhat from the level of the feed box bottom to the somewhat lower level of the bottom of the bale chamber.

The continued advance of the hay across the bale chamber distributes the hay all the way across same, as above described. Thus, due to the consolidating of the upper portion of the hay, and the simultaneous expansion of the lower portion, the hay received in the bale chamber will be of substantially uniform density throughout its vertical extent. The invention thereby overcomes the difficulty inherent in side feed balers in uniformly filling the bale chamber for its full depth.

In this application I have shown and described only the preferred embodiment of my invention, merely by way of illustration of the practice thereof, as by law required. However, I recognize that my invention is capable of other and different embodiments and that the several details of the invention may be modified in various ways, all without departing from my invention. Accordingly, the drawings and description herein are to be construed as merely illustrative in nature, and not as exclusive.

I claim:

1. In an automatic pick-up baler of the class in which gathered crop material is fed horizontally through a feed opening in the side of the bale casing into the path of a bale plunger reciprocating in said casing to compress the material forwardly therein, the combination with said baler of infeed mechanism comprising a covered feed box supported on said baler beside said feed opening, said box including a condenser chamber extending parallel to said bale casing and communicating therewith through said feed opening, a condenser carried by said plunger for reciprocation in said chamber, a substantially vertical partition disposed in the feed box transversely to the plunger movement in a plane transecting said condenser chamber, the partition terminating short of said condenser chamber, a feed auger operatively disposed in said feed box on one side of said partition, said auger extending transversely to the movement of the bale plunger to deliver material into said condenser chamber for movement by said condenser, a wadboard disposed in said feed box on the other side of said partition for horizontal reciprocation across said condenser chamber and through said feed opening into the bale casing, and mechanism operable to reciprocate the wadboard into said bale casing on each retraction stroke of the plunger and condenser, and to retract said wadboard from the path of movement of said plunger and condenser on the compression stroke of the latter, said plunger, condenser and wadboard all moving in horizontal paths at a common level.

2. In an automatic pick-up baler of the class in which gathered crop material is fed horizontally through a feed opening in a side of the bale casing into the path of a bale plunger reciprocating in said casing to compress the material forwardly therein, the combination with said baler of infeed mechanism comprising a covered feed box supported on said baler beside said feed openin, said box including a condenser chamber extending parallel to said bale casing and communicating therewith through said feed opening, a condenser reciprocated in said chamber by the plunger through means passing through said feed opening, a substantially vertical partition disposed in the feed box transversely to the plunger movement in a plane transecting said condenser chamber, the partition terminating short of said condenser chamber, a feed auger operatively disposed in said feed box on one side of said partition, said auger extending transversely to the movement of the bale plunger to deliver material into said condenser chamber for movement by said condenser, a wadboard disposed in said feed box on the other side of said partition for horizontal reciprocation across said condenser chamber and through said feed opening into the bale casing, and mechanism operable to reciprocate the wadboard into said bale casing on each retraction stroke of the plunger and condenser, said plunger, condenser and wadboard all moving in horizontal paths at a common level.

3. In an automatic pick-up baler of the class in which gathered crop material is fed horizontally through a feed opening in a side of the bale casing into the path of a bale plunger reciprocating in said casing to compress the material forwardly therein, the combination with said baler of infeed mechanism comprising a feed box supported on said baler beside said feed opening, said box including a condenser chamber extending parallel to said bale casing and communicating therewith through said feed opening, a condenser connected to said plunger for reciprocation therewith in said condenser chamber, a substantially vertical partition disposed in the feed box transversely to the plunger movement in a plane transecting said condenser chamber, the partition terminating short of said condenser chamber, a feed auger operatively disposed in said feed box on one side of said partition, said auger extending transversely to the movement of the bale plunger to deliver material into said condenser chamber for movement by said condenser, a wadboard disposed in said feed box on the other side of said partition for horizontal reciprocation parallel to the auger across said condenser chamber and through said feed opening into the bale casing, and mechanism operable to reciprocate the wadboard into said bale casing on each retraction stroke of the plunger and condenser.

4. In an automatic pick-up baler of the class in which gathered crop material is fed horizontally through a feed opening in a side of the bale casing into the path of a bale plunger reciprocating in said casing to compress the material forwardly therein, the combination with said baler of infeed mechanism comprising a feed box supported on said baler beside said feed opening, said box including a condenser chamber extending parallel to said bale casing and communicating therewith through said feed opening, a condenser connected to said plunger for reciprocation therewith in said condenser chamber, a feed auger operatively disposed in said feed box, said auger extending transversely to the movement of the bale plunger to deliver material into said condenser chamber for movement by said condenser, a wadboard disposed in said feed box for horizontal reciprocation parallel to the auger across said condenser chamber and through said feed opening into the bale casing, and mechanism operable to reciprocate the wadboard into said bale casing on each retraction stroke of the plunger and condenser.

5. In an automatic pick-up baler of the class in which gathered crop material is fed horizontally through a feed opening in a side of the baler casing into the path of a bale plunger reciprocating in said casing to compress the material therein, the combination with said baler of infeed mechanism comprising a feed box supported on one side of and at a common level with the baler casing, said box including a condenser chamber extending parallel to the baler, a condenser reciprocable in the condenser chamber parallel to the movement of the plunger, means coupling said condenser to the plunger for movement therewith, a first cross feed conveyor operating in said feed box transversely to the baler casing and delivering material into one portion of said condenser chamber, a second cross-feed conveyer disposed in said feed box along side said first cross-feed conveyer for reciprocation transversely to the baler casing across another portion of said condenser chamber and through the feed opening into said bale casing, and mechanism for reciprocating said second cross feed conveyer into and out of said baler casing in opposite phase to both the plunger and the condenser reciprocations.

6. A baler having infeed mechanism as defined in claim 5, the coupling means between the condenser and the bale plunger extending through and being reciprocable in said feed opening.

7. The combination defined in claim 5, in which the feed opening extends longitudinally of the bale chamber and has portions in transverse alignment both with the wadboard and with the first cross-feed conveyer, whereby the first cross-feed conveyer may urge material directly through the feed opening in the retracted position of the condenser.

8. Infeed mechanism for a baler having a feed opening in one side of a bale casing comprising, a covered feed box having a forward end and a rear end and being formed interiorly with a condenser chamber, a condenser disposed for reciprocation in said chamber toward and away from said forward end, means providing said box interiorly with two compartments extending transverse to the direction of reciprocation of said condenser and respectively communicating with said condenser chamber, one of said compartments being laterally opposite to said feed opening, a first cross-feed conveyer operating in the other of said compartments to urge material laterally in front of said condenser, whereby said material may be moved forwardly by the condenser into lateral alignment with said one compartment, a second cross-feed conveyer in said one compartment, and means reciprocating said second conveyer parallel to said first conveyeor across said condenser chamber and through said feed opening in opposite phase to the reciprocatory movement of the condenser, said condenser and said cross-feed conveyers all being disposed and moving in a common plane.

9. A mechanism for feeding material into the bale casing of an automatic baler comprising a feed box having a forward end and a rear end, a condenser within said box, means reciprocating said condenser toward and away from said forward end of said feed box, a first feed element rotatable in said box to urge material horizontally transversely across the box and into the path of said condenser, whereby the condenser may move the material forwardly in the box, a second feed element within said box reciprocable transversely horizontally across said box and parallel to said first feed element, and means reciprocating same across the path of the condenser in opposite phase to the reciprocating movement of the condenser, said condenser and feed elements being disposed and operating at a common level.

10. A mechanism as defined in claim 9, whereby the first feed element comprises a feed auger rotating about an axis transverse to the movement of the condenser and terminating adjacent and in spaced relation to the reciprocating path of the condenser.

11. A baler infeed mechanism as defined in claim 8, wherein said feed box is formed with an outlet opening at its forward end in front of the reciprocating condenser, a closure covering said opening, and spring means normally holding said closure closed, said closure being open to relieve an abnormal accumulation of material in front of the condenser, when the accumulated material exerts a force against said door greater than the closing force of said spring means.

12. In an automatic pick-up baler of the class in which gathered crop material is fed horizontally through a feed opening in the side of the baler casing, into the path of a bale plunger reciprocating in said casing and having its compression stroke in a forward direction, the combination with said baler of infeed mechanism comprising, a condenser chamber extending parallel to said casing and communicating therewith through said feed opening, a cross-feed conveyer delivering gathered material into said chamber, a wadboard reciprocably disposed forwardly of said cross feed conveyer, means for reciprocating said wadboard through said feed opening and partially across said bale casing transversely to the movement of said plunger and in opposite phase to the plunger reciprocation, and a condenser carried by said plunger for movement in said condenser chamber to transfer crop material longitudinally from said cross feed conveyer to the wadboard during the compression stroke of the plunger.

13. The combination set forth in claim 12, wherein said condenser is displaced rearwardly from the operative end of said bale plunger in a direction away from the wadboard, to lag behind said plunger and provide increased time for withdrawal of the wadboard on the compression stroke of the plunger, and to lead said plunger on the retraction stroke in clearing the path of movement of said wadboard into the feed opening, said plunger serving to close said infeed opening on its compression stroke and thereby confine the material operated upon by the condenser.

14. In an automatic pick-up baler of the class in which gathered crop material is fed horizontally through a feed opening in the side of a bale casing into the path of a plunger reciprocating in said casing and having its compression stroke in a forward direction, the combination with said baler of infeed mechanism comprising a condenser chamber extending parallel to said bale casing and communicating therewith through said feed opening, a first cross-feed mechanism operative to move gathered crop material into said condenser chamber transversely to the travel of the bale plunger, a second cross-feed mechanism disposed forwardly of the first cross-feed mechanism with regard to the compression stroke of the bale plunger, for reciprocation across said condenser chamber and into said bale casing in opposite phase with the movement of said plunger, and a transfer element carried by the plunger for reciprocation in said condenser chamber to transfer material from said first cross-feed mechanism to said second cross feed mechanism during the compression stroke of the plunger.

15. In an automatic baler having a plunger reciprocating in a bale chamber and infeed mechanism delivering hay into said chamber, said infeed mechanism including a wadboard reciprocating into said chamber through the side thereof, the combination therewith of drive means for said wadboard including an element having a portion reciprocable parallel to the bale plunger, and means connecting said reciprocable portion to the plunger for movement therewith to move the wadboard into and out of the bale chamber during the retraction and compression strokes respectively of the plunger, said means comprising separable members connected with the plunger and the reciprocable portion respectively and disposed for positive abutment on the compression stroke of the plunger, and frangible means connecting said members for movement together on the retraction stroke of the plunger, said frangible means being arranged to part and release said connection responsive to a predetermined amount of resistance to the movement of the wadboard into the bale chamber.

16. In an automatic pick-up baler of the class in which gathered crop material is fed into the path of a reciprocating bale plunger, the combination of a condenser reciprocating parallel to and in phase with the plunger, said condenser having a side wall on the side thereof remote from the plunger, means forming with the condenser side wall a throat of closed cross-section along side the condenser path, a conveyer in advance of said throat supplying material along side and into the path of reciprocation of the condenser to be advanced by the condenser through the throat, and a wadboard reciprocable beyond the throat transversely across the path of both the plunger and the condenser in opposite phase to the reciprocations of both, whereby said wadboard engages material advanced through the throat into its path by the reciprocating condenser and feeds such material into position for engagement by the plunger, the said material normally extending continuously from the conveyer to the wadboard and during the advance stroke of the condenser, extending through said throat and to the conveyer.

17. In an automatic pick-up bailer of the class in which gathered crop material is fed transversely into the path of a reciprocating bale plunger, the combination of a condenser reciprocating with and parallel to the reciprocation of the plunger, means supplying material into the path of reciprocation of the condenser, and a device reciprocable transversely across the paths of both the plunger and condenser in opposite phase to the reciprocations of both, whereby the device engages material advanced into its path by the reciprocating condenser and feeds such material into position for engagement by the plunger, said condenser being displaced rearwardly in a direction away from the wadboard from the operative end of the bale plunger to lag behind said plunger and provide increased time for retraction of the device on the compression stroke of the plunger.

18. In an automatic pick-up baler of the class in which gathered crop material is fed into the path of a reciprocating bale plunger, the combination of a condenser reciprocating with and parallel to the plunger, a cross-feed mechanism urging gathered crop material into the path of reciprocation of the condenser, and a device reciprocable transversely across the paths of both the plunger and condenser in opposite phase to the reciprocations of both, whereby the device engages material advanced into its path by the reciprocating condenser and feeds such material into position for engagement by the plunger.

19. Baler infeed mechanism comprising a covered feed box, a feed screw disposed horizontally over the floor of said box, and means delivering hay over said floor beneath said auger for operative engagement by the auger, a condenser having a vertical side wall reciprocating past one end of the auger in spaced relation thereto, means rotating the auger in a direction to feed the hay toward said condenser, whereby during movement of the condenser in alignment with the auger, the auger consolidates hay against said condenser side wall in the form of a vertical ribbon extending between and confined vertically by the top and bottom respectively of the feed box, said feed box being provided with a feed opening in the side wall thereof and remote from the auger, a wadboard in the feed box reciprocating through the feed opening transversely to the condenser reciprocation, the reciprocation of the condenser progressing said vertical ribbon of hay into alignment with the wadboard, and the feed box cover sloping downwardly toward the feed opening, whereby reciprocation of the wadboard progresses the hay through the feed opening, and the sloping cover consolidates the upper portion of the hay during its movement toward the feed opening.

20. An infeed mechanism as defined in claim 19, wherein the wadboard comprises endwise serrations insertible into the hay and vertically supporting same against bodily displacement to thereby localize the consolidating action of the sloping cover to the upper portion of the hay.

21. In an automatic pick-up baler of the class in which gathered crop material is fed horizontally through a feed opening in the side of a bale casing into the path of a bale plunger reciprocating in said casing, the combination with said baler of infeed mechanism comprising, a condenser chamber extending parallel to said bale casing and communicating therewith through said feed opening, a cross-feed conveyor delivering gathered material into said casing, a wadboard reciprocably disposed forwardly of said cross-feed conveyor in the direction of the plunger compression stroke, and means for reciprocating said wadboard through the feed opening and in opposite phase to the plunger reciprocation, and a condenser disposed for operative movement in said condenser chamber to transfer crop material longitudinally from said cross-feed conveyor to the wadboard during the compression stroke of the plunger.

22. In an automatic pick-up baler of the class in which gathered crop material is fed horizontally through a feed opening in the side of a bale casing into the path of a plunger reciprocating in said casing, the combination with said baler of infeed mechanism comprising a condenser chamber extending parallel to said bale chamber and communicating therewith through said feed opening, a first cross-feed mechanism operative to move gathered crop material into said condenser chamber transversely to the travel of the bale plunger, a second cross-feed mechanism disposed forwardly of the first cross-feed mechanism in the direction of the compression stroke of the bale plunger, for reciprocation across said condenser chamber and into said bale casing in opposite phase with the movement of said plunger, and a transfer element operating in said condenser chamber during the compression stroke of the plunger to transfer material from said first cross-feed mechanism to said second cross-feed mechanism.

23. In an automatic pick-up baler of the class in which gathered crop material is fed horizontally through a feed opening in the side of a bale casing into the path of a plunger reciprocating in said casing, the combination with said baler of infeed mechanism comprising a wadboard reciprocating into and from said feed opening transversely to the plunger movement and in opposite phase thereto, a condenser operative during withdrawal of said wadboard from the feed opening to move material forwardly in the direction of the plunger compression movement into the path of reciprocation of the wadboard, and an auger disposed rearwardly of said wadboard and operating to deliver material to said condenser for transfer thereby into the path of reciprocation of the wadboard, during the compression movement of the plunger.

References Cited in the file of this patent

UNITED STATES PATENTS

| 365,824 | La Dow | July 5, 1887 |
| 455,731 | Bates | July 14, 1891 |
| 771,576 | Sanders | Oct. 4, 1904 |
| 1,210,324 | Johansen | Dec. 26, 1916 |
| 1,850,134 | Myer | Mar. 22, 1932 |
| 2,450,082 | Crumb et al. | Sept. 28, 1948 |
| 2,524,233 | Russell | Oct. 3, 1950 |
| 2,527,887 | Martin | Oct. 31, 1950 |
| 2,545,188 | Baskerville | Mar. 13, 1951 |
| 2,571,489 | Russell | Oct. 16, 1951 |

FOREIGN PATENTS

| 114,961 | Germany | Nov. 30, 1900 |